United States Patent [19]
Channell

[11] 3,939,301
[45] Feb. 17, 1976

[54] FIXED COUNT UNDERGROUND CABLE TERMINAL

[76] Inventor: William H. Channell, 122 Oak Tree Drive, Glendora, Calif. 91740

[22] Filed: Apr. 29, 1974

[21] Appl. No.: 464,853

[52] U.S. Cl. ............... 174/72 R; 29/628; 29/630 F; 174/37
[51] Int. Cl.² ......................................... H02G 3/00
[58] Field of Search ......... 174/38, 76, 87, 72 R, 37; 29/624, 627, 628, 629, 630 F

[56] References Cited
UNITED STATES PATENTS

| | | | |
|---|---|---|---|
| 3,725,580 | 4/1973 | Thompson et al. | 174/87 X |
| 3,806,630 | 4/1974 | Thompson | 174/76 X |

*Primary Examiner*—Arthur T. Grimley
*Attorney, Agent, or Firm*—Christie, Parker & Hale

[57] ABSTRACT

A waterproof cable junction for connecting a number of service lines to a common cable. The junction provides a housing having a multi-line input cable and a plurality of single line output cables, the conductors of the input cable being spliced to the conductors of the output cables within the housing and the housing filled with a sealing or potting compound. Each of the output cables is of relatively short length with the outer end permanently sealed to prevent moisture from entering the housing through the free end of the outer cable. Preferably, the output cables are looped back so that the outer ends are brought back into the housing and sealed within the housing by the potting compound.

4 Claims, 5 Drawing Figures

FIXED COUNT UNDERGROUND CABLE TERMINAL

FIELD OF THE INVENTION

This invention relates to cable junctions, and more particularly, to a permanently wired and sealed junction for connecting a multi-conductor cable to a plurality of single conductor cables.

BACKGROUND OF THE INVENTION

The trend in modern housing developments has been to run all utility service, including telephone lines, underground. Each phone line installation requires a line pair from the house out to a multi-line cable running along the property lines of the houses where a junction is required to tie the line pair into the cable. Some type of water-tight and air-tight junction box must be provided to allow a splicer to tie the service line from the house into the multi-line cable. If a customer at any time requires an additional line, the junction box must be opened up and a new service line spliced into the cable. This splicing operation has proven to be a source of trouble, resulting in higher installation and maintenance costs. Trouble may result either from the junction box not being properly sealed so that moisture is later able to enter or the splicing operation is not properly carried out.

Generally, the companies have hired trained personnel, called splicers, who handle the connection of service lines into a main multi-line cable, whereas, less highly trained personnel, referred to as installers, are used to install phone equipment at the subscriber's premises. In the past, equipment for connecting underground lines into an underground cable has required the skill of the splicer to be employed whenever additional service lines were to be added to the system.

SUMMARY OF THE INVENTION

The present invention is directed to a pre-wired, permanently sealed junction for connecting one or more individual service lines into a main cable in an underground installation. Individual line connections can be made by an installer since access to the main cable is not required after initial installation and the unit remains sealed, thus avoiding the likelihood of moisture gaining access to the line connections.

This is accomplished, in brief, by providing a cable junction including a housing, a length of input cable having a plurality of conductor wires in the cable with one end of the cable extending into the housing, a plurality of short lengths of output cable, each cable having at least one pair of conductor wires. At least one end of the output cable extends into the housing. The respective conductive wires of the output cables are connected in the housing to conductor wires of the input cable, the connections being permanently sealed by a potting compound which fills the housing. The other ends of the lengths of output cable are also permanently sealed, either by terminating them inside a separate housing which is also filled with potting compound, or by looping the ends back into the same housing and sealing them in the same potting compound which seals the spliced connections with the input cable. The sealed ends of the output cables can later be cut to complete connection to a subscriber installation.

DESCRIPTION OF THE DRAWINGS

For a better understanding of the invention, reference should be made to the accompanying drawings wherein.

DETAILED DESCRIPTION

Figure 1:
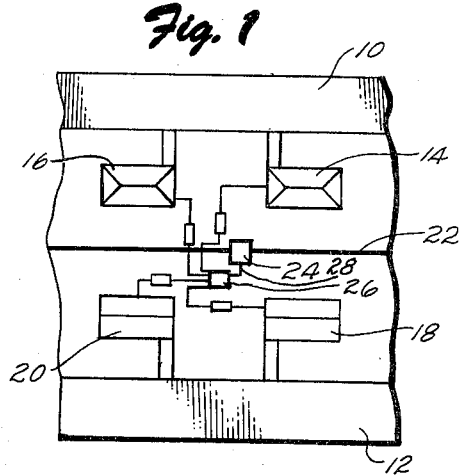
FIG. 1 is a plan view of a portion of a typical housing tract.

Referring to FIG. 1, there is shown a portion of a typical housing tract having streets 10 and 12 with houses, such as indicated at 14 and 16, fronting on the street 10 and houses 18 and 20 fronting on the street 12. Telephone service to the houses is provided by a multi-line cable 22 extending along the common rear property line in back of the houses. The cable 22 is laid in a trench and covered over. In a typical installation, the cable 22 provides a plurality of separate lines going back to the central exchange. When the owner of one of the housing units subscribes to a phone line, a line connection must be spliced into the cable 22 to provide a line going to the house. The various types of terminals for splicing into an underground cable are used for this purpose. See for example U.S. Pat. No. 3,435,124. However, each time an additional subscriber line is required, either for the same house or for an adjoining house, the terminal must be opened up and a new line spliced into the cable. This affords an opportunity for loss of an effective seal and involves the services of a highly skilled splicer.

According to the present invention, a cable splice terminal 24 is provided at the corner of four adjacent lots along the cable 22. A pre-wired junction assembly indicated generally at 26, hereinafter described in detail in connection with FIGS. 2–5, is spliced into the cable 22 through the terminal 24. The permanently wired junction assembly 26 has a plurality of output lines whose ends are permanently sealed. When an installer wishes to connect a line from a house to the cable, he merely cuts one of the output cables and connects it to a line going to the house to provide a single line connection. Until the output lines are cut, they remain permanently sealed, preventing any moisture from getting into the cable system. Once the junction assembly 26 is spliced into the cable 22, there is no need to unseal the terminal 24.

Figure 3:
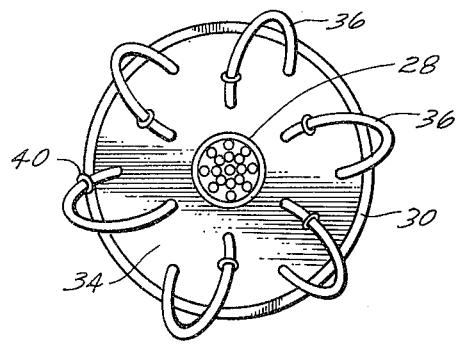
FIG. 3 is an end view of the cable junction of FIG. 2.
Figure 2:
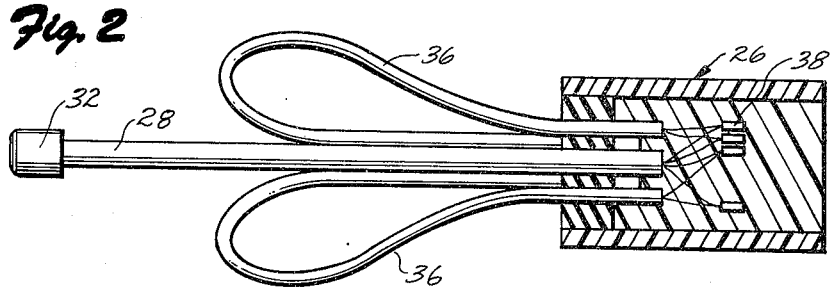
FIG. 2 is a cross-sectional view of one embodiment of the invention.
Figure 4:
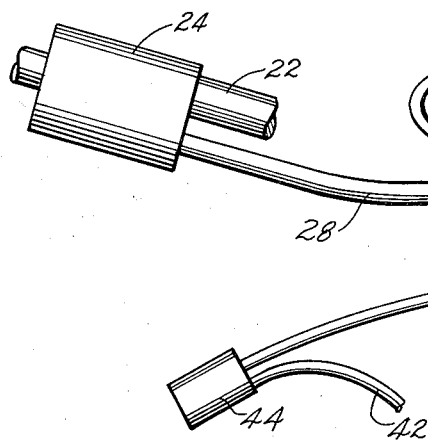
FIG. 4 is a view of the junction of FIG. 2 when it is installed.
Figure 4:
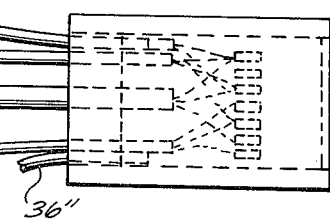

One embodiment of the junction assembly 26 is shown in FIGS. 2, 3 and 4. In this embodiment, a short length of input cable 28 is provided which enters a junction assembly housing 30 which is preferably in the form of a cylindrical length of rigid, tubular plastic material. The input cable 28, by way of example, includes six pairs of leads, providing service for up to six separate telephone lines. The outer end of the input cable 28 is provided with a removable plastic cap 32 to protect the end of the input cable until the junction assembly is installed. The input cable 28 enters the housing 30 through a central opening in a rubber grommet 34. The grommet is pressed into the end of the cylindrical tubing forming the housing 30 and forms a water-tight seal with both the input cable and the housing.

In addition to the central opening through which the input cable 28 passes, the grommet 34 is provided with six holes concentrically positioned around the center of the grommet through which the ends of six output cables, indicated at 36, extend. The lengths of output cable 36 each include one pair of leads to provide one connection to one telephone line. Pairs of leads of each of the output cables 36 are permanently spliced to corresponding pairs of leads from the input cable 28 within the housing 30, as indicated at 38.

The grommet 34 is provided with a second group of holes whose centers are concentrically located outside the first group of holes. The outer lengths of output cable 36 are looped around and inserted through these outer holes to form six closed loops. The end of the input cable 28, as well as both ends of the output cables 36, are placed through the grommet 34 to provide a permanent seal between the housing and the respective lengths of cable. Spliced connections between the input length of cable and the respective output cables are made with the housing 30 by conventional solderless connectors 38. The spliced connections are only made between one end of the output cable and the input cable, the other end of the output cable terminating in an open end within the housing 30. Once the spliced connections are made, the interior of the housing 30 is filled with a suitable sealing material, such as a potting compound, which permanently seals off the spliced connections and the open ends of the respective lengths of cable. Thus the junction assembly as shown in FIGS. 2 and 3 forms a permanently wired, permanently sealed junction assembly.

The junction assembly 26 is installed by a splicer who removes the protective cap 32 and connects the end of the input cable 28 into the terminal 24 where the respective leads are spliced into the appropriate conductors within the main cable 22. This completes the job of the splicer. The entire junction assembly 26, along with the terminal 24, can be buried in the earth and it forms a completely waterproof connection to the cable 22.

When an installer wishes to connect a line into one of the houses, he selects one of the output cables 36 from the junction assembly 26. Each of the output lines is appropriately identified, as by means of a metal tag 40 having a stamped identification number on it, so that the installer can select the correct line assigned to the subscriber by the telephone company. Then the installer cuts the output cable where the looped end enters the outermost hole in the grommet 34. The severed end of the output cable, as indicated at 36″, remains sealed in the grommet so that the interior of the housing 30 remains sealed against air and moisture. The remaining length 36′ of the severed output cable is then connected to a cable 42 going to the subscriber's premises through a standard line splicing unit 44, such as the type described in U.S. Pat. No. 3,458,649.

Figure 5:
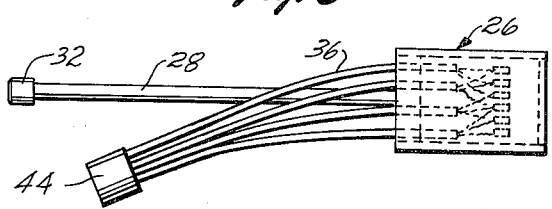
FIG. 5 shows an alternate embodiment of the present invention.

While the arrangement described above in connection with FIGS. 2, 3 and 4 is the preferred embodiment, the output cables may be terminated in a separate housing rather than being looped back and terminated in the same housing. As shown in the modification of FIG. 5, the output cables 36 have their outer ends terminated in a separate housing 44. The ends of the cables 36 are immersed in a potting compound within the housing 44 to permanently seal off the ends of the cables. When a particular output cable is selected for connection to a house by the installer, he cuts the cable adjacent the point where it enters the housing 44. The cut end of the cable 36 can then be connected to a service line to the house in the same manner described above in connection with FIG. 4.

What is claimed is:

1. A cable junction for providing connection between a multi-line telephone cable and a plurality of service cables, comprising a housing, a single short stub length of input cable having a plurality of conductor wires in the cable, one end of the cable stub extending into the housing, a plurality of short lengths of output cables, each output cable having at least one conductor wire, one end of the output cables extending into the housing with the respective conductor wires being connected in the housing to the conductor wires of the input cable, sealing means filling the housing and permanently sealing the conductor wire connections, and means permanently sealing the other ends of the short lengths of output cable.

2. Apparatus of claim 1 wherein the last-named means includes a separate housing into which said other ends of the output cables are inserted, and sealing means filling the housing and permanently sealing said other ends of the output cables.

3. Apparatus of claim 1 wherein the last-named means includes the same housing receiving the input cable, each individual length of output cable being formed in a loop outside the housing with both ends of each loop terminating inside the housing to permit both ends to be sealed by said sealing means within the housing.

4. A method of making connections to a buried multi-line telephone cable to a plurality of service cables, comprising the steps of: prewiring a cable junction between one end of a single short length of multi-line cable stub and one end of a plurality of short length service cable stubs, permanently sealing the other end of the service cable stubs, splicing the single multi-line cable stub to the buried telephone cable, removing the sealed end of selected ones of the service cable stubs, and splicing the remaining portion of each of the selected service cable stubs to the service cables.

* * * * *